United States Patent
Steel et al.

(10) Patent No.: US 7,270,257 B2
(45) Date of Patent: Sep. 18, 2007

(54) OUT-OF-POSITION FRICTION STIR WELDING OF HIGH MELTING TEMPERATURE ALLOYS

(75) Inventors: Russell Steel, Salem, UT (US); Tracy W. Nelson, Springville, UT (US); Carl D. Sorensen, Provo, UT (US); Scott Packer, Alpine, UT (US)

(73) Assignees: SII Megadiamond, Inc., Provo, UT (US); Advanced Metal Products, Inc., West Bountiful, UT (US); Brigham Young University, Provo, UT (US)

( * ) Notice: Subject to any disclaimer, the term of this patent is extended or adjusted under 35 U.S.C. 154(b) by 102 days.

(21) Appl. No.: 10/769,551

(22) Filed: Jan. 30, 2004

(65) Prior Publication Data

US 2005/0035173 A1    Feb. 17, 2005

Related U.S. Application Data

(60) Provisional application No. 60/443,801, filed on Jan. 30, 2003.

(51) Int. Cl.
*B23K 31/02* (2006.01)
(52) U.S. Cl. .................... 228/2.1; 228/112.1
(58) Field of Classification Search ............ 228/112.1, 228/2.1, 46, 200
See application file for complete search history.

(56) References Cited

U.S. PATENT DOCUMENTS

| 4,144,110 | A | 3/1979 | Luc |
|---|---|---|---|
| 5,460,317 | A | 10/1995 | Thomas et al. |
| 5,611,479 | A | 3/1997 | Rosen |
| 5,697,511 | A | 12/1997 | Bampton |
| 5,713,507 | A | 2/1998 | Holt et al. |
| 5,718,366 | A | 2/1998 | Colligan |
| 5,758,999 | A | 6/1998 | Geise |
| 5,769,306 | A | 6/1998 | Colligan |
| 5,794,835 | A | 8/1998 | Colligan et al. |
| 5,811,755 | A | 9/1998 | McGee |
| 5,813,592 | A | 9/1998 | Midling et al. |
| 5,829,664 | A | 11/1998 | Spinella et al. |
| 5,971,247 | A | 10/1999 | Gentry |
| 5,971,252 | A | 10/1999 | Rosen et al. |
| 5,975,406 | A | 11/1999 | Mahoney et al. |
| 6,045,027 | A | 4/2000 | Rosen et al. |
| 6,045,028 | A | 4/2000 | Martin et al. |
| 6,050,474 | A | 4/2000 | Aota et al. |
| 6,050,475 | A | 4/2000 | Kinton et al. |
| 6,051,325 | A | 4/2000 | Talwar et al. |
| 6,053,391 | A | 4/2000 | Heideman et al. |
| 6,070,784 | A | 6/2000 | Holt et al. |
| 6,138,895 | A | 10/2000 | Oelgoetz et al. |

(Continued)

FOREIGN PATENT DOCUMENTS

EP    0 797 043 A2    9/1997

(Continued)

*Primary Examiner*—Jonathan Johnson
(74) *Attorney, Agent, or Firm*—Morris O'Bryant Campagni

(57) ABSTRACT

A system and method for performing friction stir welding of non-planar materials having high melting temperatures, wherein a process is provided for performing longitudinal and radial welds on objects such as pipes, flanges, tanks, and shrouds, and wherein an active or passive mandrel provides support for the friction stir welding process.

36 Claims, 14 Drawing Sheets

U.S. PATENT DOCUMENTS

| | | |
|---|---|---|
| 6,168,066 B1 | 1/2001 | Arbegast |
| 6,168,067 B1 | 1/2001 | Waldron et al. |
| 6,173,880 B1 | 1/2001 | Ding et al. |
| 6,193,137 B1 | 2/2001 | Ezumi et al. |
| 6,206,268 B1 | 3/2001 | Mahoney |
| 6,257,479 B1 | 7/2001 | Litwinski et al. |
| 6,259,052 B1 | 7/2001 | Ding et al. |
| 6,450,395 B1 | 9/2002 | Weeks et al. |

FOREIGN PATENT DOCUMENTS

| | | |
|---|---|---|
| EP | 0 810 054 A1 | 12/1997 |
| EP | 0 833 097 A2 | 4/1998 |
| EP | 0 867 254 A1 | 9/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 810 055 B1 | 12/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| WO | WO93/10935 | 6/1993 |
| WO | WO97/15462 | 5/1997 |
| WO | WO97/48517 | 12/1997 |
| WO | WO98/13167 | 4/1998 |
| WO | WO98/45080 | 10/1998 |
| WO | WO98/51441 | 11/1998 |
| WO | WO98/58759 | 12/1998 |
| WO | WO99/32254 | 7/1999 |
| WO | WO99/32255 | 7/1999 |
| WO | WO99/33594 | 7/1999 |
| WO | WO99/34951 | 7/1999 |
| WO | WO99/39861 | 8/1999 |
| WO | WO99/52669 | 10/1999 |
| WO | WO99/54081 | 10/1999 |
| WO | WO99/58288 | 11/1999 |
| WO | WO99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |
| WO | WO 01/85385 A1 | 11/2001 |
| WO | WO 02/100586 A1 | 12/2002 |

OUT-OF-POSITION FRICTION STIR WELDING OF HIGH MELTING TEMPERATURE ALLOYS

CROSS REFERENCE TO RELATED APPLICATIONS

This document is a claims priority to the provisional patent application Ser. No. 60/443,801, filed Jan. 30, 2003.

BACKGROUND OF THE INVENTION

1. Field of the Invention

This invention relates generally to friction stir welding (FSW) wherein heat for creating a weld is generated by plunging a rotating pin of a tool into a workpiece. More specifically, the present invention relates to a new tool and a new application of that tool when it is used in a friction stir welding process that enables the present invention to weld materials that are not functionally weldable using state of the art friction stir welding processes and tools, said materials including ferrous alloys such as stainless steel, and higher melting point super alloys that contain only small amounts of or no ferrous materials at all. The previously filed applications apply to making welds that are planar. However, this new process and apparatus enables friction stir welding of non-planar surfaces such as stainless steel pipe, flanges, tanks, shrouds, etc. The invention can thus apply friction stir welding techniques to perform longitudinal welds, radial welds, weld repairs, friction stir processing to achieve specific micro structures, etc., on high melting temperature alloys.

2. Description of Related Art

Friction welding has been used in industry for years. It is a solid-state process that yields large economic benefits because it avoids many problems associated with rapid solidification of molten material that occurs in traditional fusion welding processes.

One example of friction welding occurs when the ends of two pipes are pressed together while one pipe is rigidly held in place, and the other is pressed against it and turned. As heat is generated by friction, the ends of the pipes become plasticized. By quickly stopping rotation of the pipes, the two pipes fuse together. Note that in this case, the frictional heating is caused by the relative motion of the two parts to be joined.

The present invention has direct applicability to the orbital friction stir welding process described above. The following material is provided simply as background for the ability to friction stir weld high melting temperature materials.

In contrast to the orbital welding process, FIG. 1 is a perspective view of a tool being used for friction stir butt welding that is characterized by a generally cylindrical tool 10 having a shoulder 12 and a pin 14 extending outward from the shoulder. The pin 14 is rotated against a workpiece 16 until sufficient heat is generated, wherein the pin of the tool is plunged into the plasticized workpiece material. The workpiece 16 is often two sheets or plates of material that are butted together at a joint line 18. The pin 14 is plunged into the workpiece 16 at the joint line 18. The frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that is generally indistinguishable from the workpiece material 16.

The prior art is replete with friction stir welding patents that teach the benefits of using the technique to obtain welds that have beneficial characteristics over contemporary fusion welding processes. These benefits include low distortion in long welds, no fumes, no porosity, no splatter, and excellent mechanical properties regarding tensile strength. Furthermore, the process has the advantage of using a non-consumable tool, no need for filler wire, no need for gas shielding, and a tolerance for imperfect weld preparations such as the presence of oxide in the weld region. The process is especially useful for preventing significant heat damage or otherwise altering the properties of the original material being welded.

However, it has long been a desire of industry to be able to weld materials that are presently functionally unweldable for friction stir welding. Thus, while friction stir welding is a very advantageous technique for welding non-ferrous alloys such as aluminum, brass and bronze, there has been no tool that is capable of functionally welding materials having higher melting points. It should be understood that functionally weldable materials are those that are weldable using friction stir welding in more than nominal lengths, and without destroying the tool.

Unfortunately, fusion welding alters or damages the alloy at the weld, thereby compromising the weld as a result of the defects or adverse phases which form in the weld during the welding process. In some cases, the non-metallic reinforcement material which has been joined with the original workpiece material to create the alloy is depleted at the weld. The result is a weld that has properties and characteristics which are different from the unaltered areas of the original workpiece material.

Until now, it has been the nature of friction stir welding that using a conventional friction stir welding tool or probe is worn down significantly so as to prevent functional welding of materials such as MMCs, ferrous alloys, and superalloys. Most tools simply do not work at all in MMCs, ferrous alloys, and superalloys. If a conventional tool could begin friction stir welding, the wear would be so significant that a probe would be torn apart after only a short distance. For example, some alloys will cause wear on a probe such that it can no longer function after welding for a distance of only inches.

Unfortunately, it is generally the case that it is not possible to simply insert a new tool and begin the friction stir welding process where the previous probe failed. If the weld is not continuous and uninterrupted, it is useless because of mechanical weakness. Furthermore, a portion of the tool is typically left behind in the workpiece material, also contributing to the mechanical weakness.

Therefore, it would be an advantage over the prior art to provide a new tool for use with the friction stir welding process that enables longer continuous and uninterrupted welding runs (functional welding) of materials that will cause a conventional tool to fail after a short distance. It would also be an advantage over the prior art if the new tool made it possible to friction stir weld materials that were previously too difficult to weld with conventional friction stir welding tools. It would also be an advantage to provide a tool that would enable friction stir welding with conventional workpiece materials, while exhibiting improved wear characteristics for the tool.

A first class of materials that would be desirable to friction stir weld but are functionally unweldable with conventional tools are known as metal matrix composites (MMCs). An MMC is a material having a metal phase and a ceramic phase. Examples of the ceramic phase include silicon carbide and boron carbide. A common metal used in MMCs is aluminum.

MMCs have desirable stiffness and wear characteristics, but they also have a low fracture toughness, thereby limiting applications. A good example of a use for MMCs is in disk brake rotors on vehicles, where stiffness, strength and wear provide advantages over present materials, and where the more brittle nature is generally not an issue. The MMC makes the rotor lighter than cast-iron, and the ceramic phase such as silicon carbide enables greater wear resistance.

Other important applications for MMCs include, but should no be considered limited to, drive shafts, cylinder liners, engine connecting rods, aircraft landing gear, aircraft engine components, bicycle frames, golf clubs, radiation shielding components, satellites, and aeronautical structures.

A second class of materials that would be desirable to friction stir weld, and which have much broader industrial applications, are ferrous alloys. Ferrous alloys include steel and stainless steel. Possible applications are far-ranging, and include the shipbuilding, aerospace, railway, construction and transportation industries. The stainless steel market alone is at least five times greater than the market for aluminum alloys. It has been determined that steels and stainless steels represent more than 80% of welded products, making the ability to friction stir weld highly desirable.

Finally, a third class of materials that would be desirable to friction stir weld, have broad industrial applications, have a higher melting point than ferrous alloys, and either have a small amount of iron or none, are the super alloys. Superalloys are nickel-, iron-nickel-, and cobalt-base alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other non-ferrous materials.

There are significant challenges that have so far prevented the creation of a tool that can functionally weld MMCs, ferrous alloys, and superalloys. Some of these challenges only became apparent during experimentation as the inventors initially attempted to modify existing tools that can friction stir weld non-ferrous alloys. These challenges and the evolution of the tool will be discussed so as to enable the reader to practice the invention.

BRIEF SUMMARY OF THE INVENTION

It is an object of the present invention to provide a system and method for friction stir welding of high melting temperature materials configured as non-planar surfaces, such as pipes, flanges, tanks, and shrouds.

It is another object to provide the system and method for friction stir welding of high melting temperature materials when performing longitudinal and radial welds of non-planar surfaces.

In a preferred embodiment, the present invention is a system and method for performing friction stir welding of non-planar materials having high melting temperatures, wherein a process is provided for performing longitudinal and radial welds on objects such as pipes, flanges, tanks, and shrouds, and wherein an active or passive mandrel provides support for the friction stir welding process.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Friction stir welding of aluminum has been well established as a cost effective and high quality joining method. Further development of aluminum FSW has lead to joining aluminum pipe for specific applications. These methods and procedures have been published and documented but have little commercial value because of limited applications.

In contrast, steel pipe is widely used for a much greater variety of applications and for more critical purposes. Moreover, weld quality is critical to handle pressures, corrosive fluids, and prevent life threatening injuries due to pipe failure in many industries and applications. For this reason, many pipe applications require ultrasonic and radiographic inspections and certifications to assure proper welds. The welds in steel pipe are fusion welds consisting of MIG, TIG, laser, etc.

It has been demonstrated that ferrous and other high temperature alloys are now friction stir weldable with the PCBN tools as taught in the patent applications to which this application claims priority. Applications are under development using these tools. However, previous developments have focused on planar or flat welds because of the difficulty of performing friction stir welding on non-planar surfaces.

Applying planar friction stir welding processes to non-planar welding applications such as stainless steel pipe, flanges, tanks, shrouds, etc., would be a tremendous benefit to the petrochemical, transportation, food, defense and other industries. However, out-of-position FSW has not been applicable because friction stir welding machine technology and tool technology and methods have not been combined. While orbital fusion welding and aluminum orbital FSW are well established processes, new methods and systems are needed to perform friction stir welding of high melting temperature materials that form non-planar surfaces.

The equipment shown in the attached figures can be used for longitudinal welds, radial welds, weld repair, friction stir processing to achieve specific micro structures, etc. This method will likely eliminate the need to pre-heat pipe for welding as well as post weld heat treatment because it is a sold state application.

Figure 1:
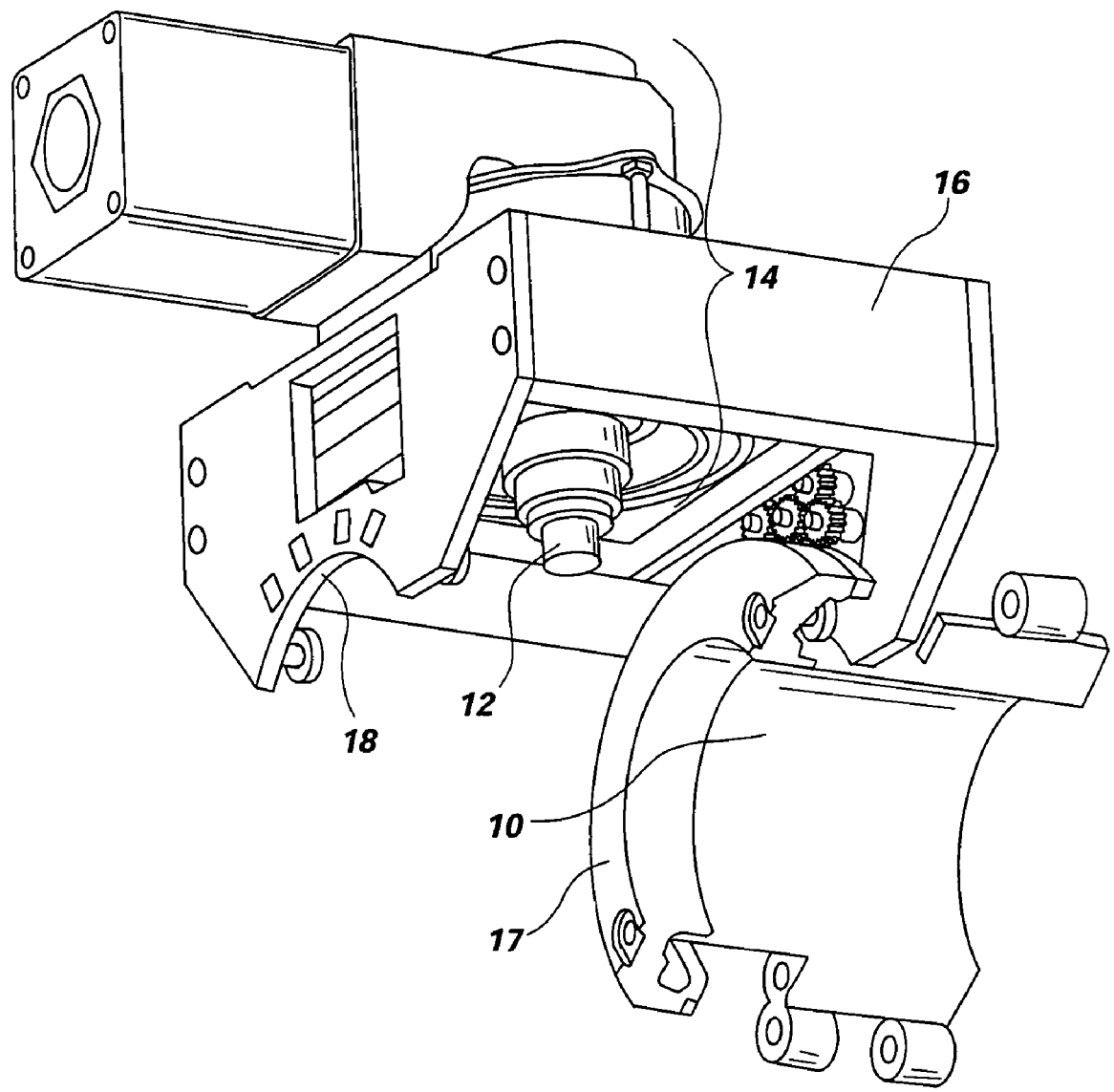
FIG. 1 is a perspective view of a first embodiment of the present invention wherein a first friction stir welding spindle head is disposed so as to weld the outside diameter (OD) of a pipe.

Beginning with FIG. 1, this figure illustrates a friction stir welding system that utilizes a first friction stir welding spindle head disposed so as to weld the outside diameter (OD) of a pipe. FIG. 1 shows a clamping member 10, and the tool 12 being held by the spindle head 14. An opposing clamping member (not shown) would hold a first pipe in place with clamping member 10. Two other clamping members (not shown) would be mounted on the frame 16 at location 18 to hold a second pipe. The tool 12 would be lowered by the spindle head 14 against a joint of the first and second pipes to perform the friction stir welding. The first and second pipes are held rigidly by the clamping members, while the tool 12 is rotated around the circumference of the pipes. Note that the clamping members may be an integral or separate part of collar 17.

Figure 2:
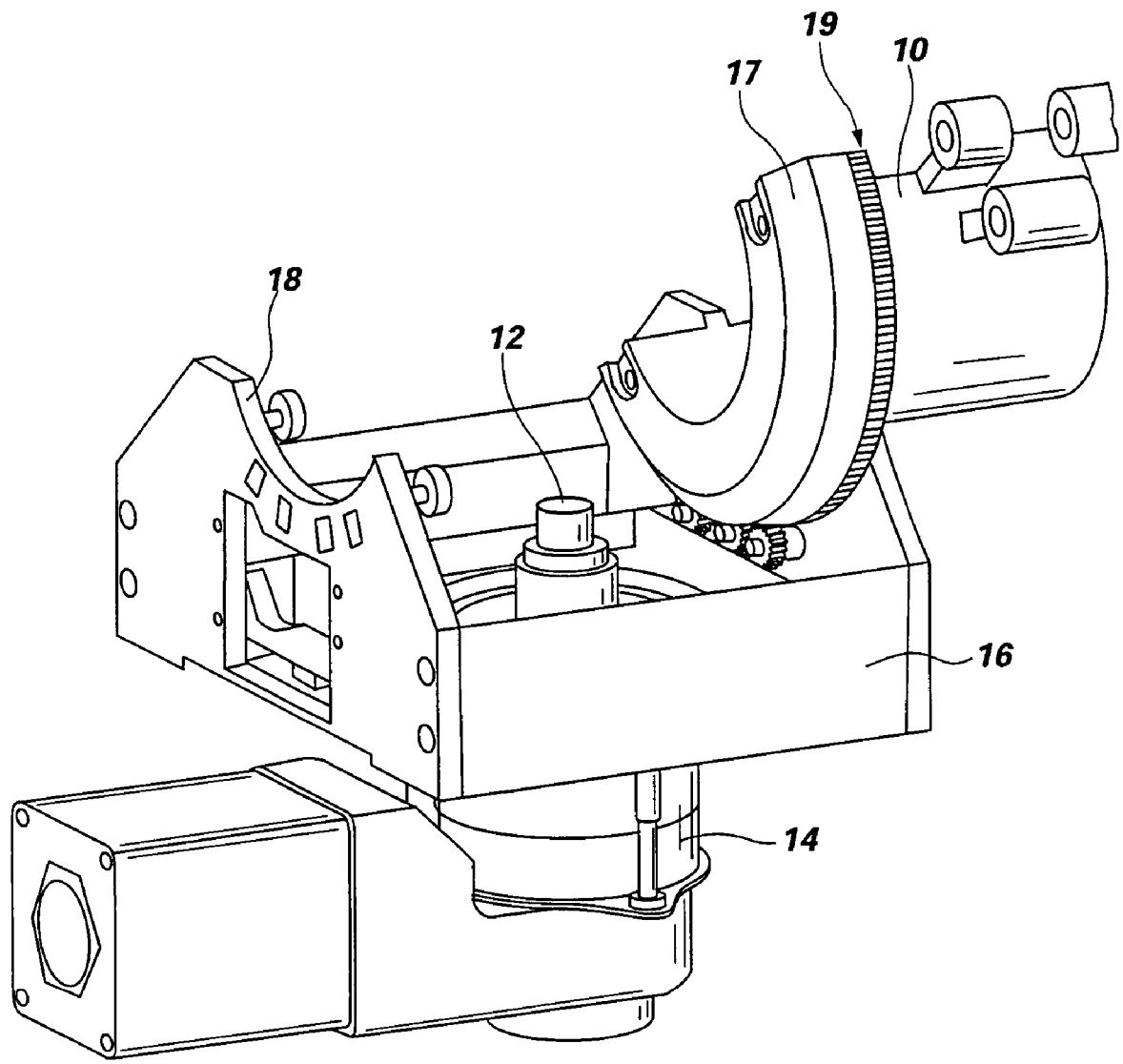
FIG. 2 is a different perspective view of FIG. 1.

FIG. 2 is a view of the system of FIG. 1, but seen from the opposite side. What is important to note are the gear teeth 19 shown on the collar 17. The gear teeth 19 enable the frame 16 to be rotated around the pipes while the clamping members remain fixed relative to the pipes. The frame 16 positions the spindle head 14 and the tool 12 along a seam between the pipes.

Figure 3:
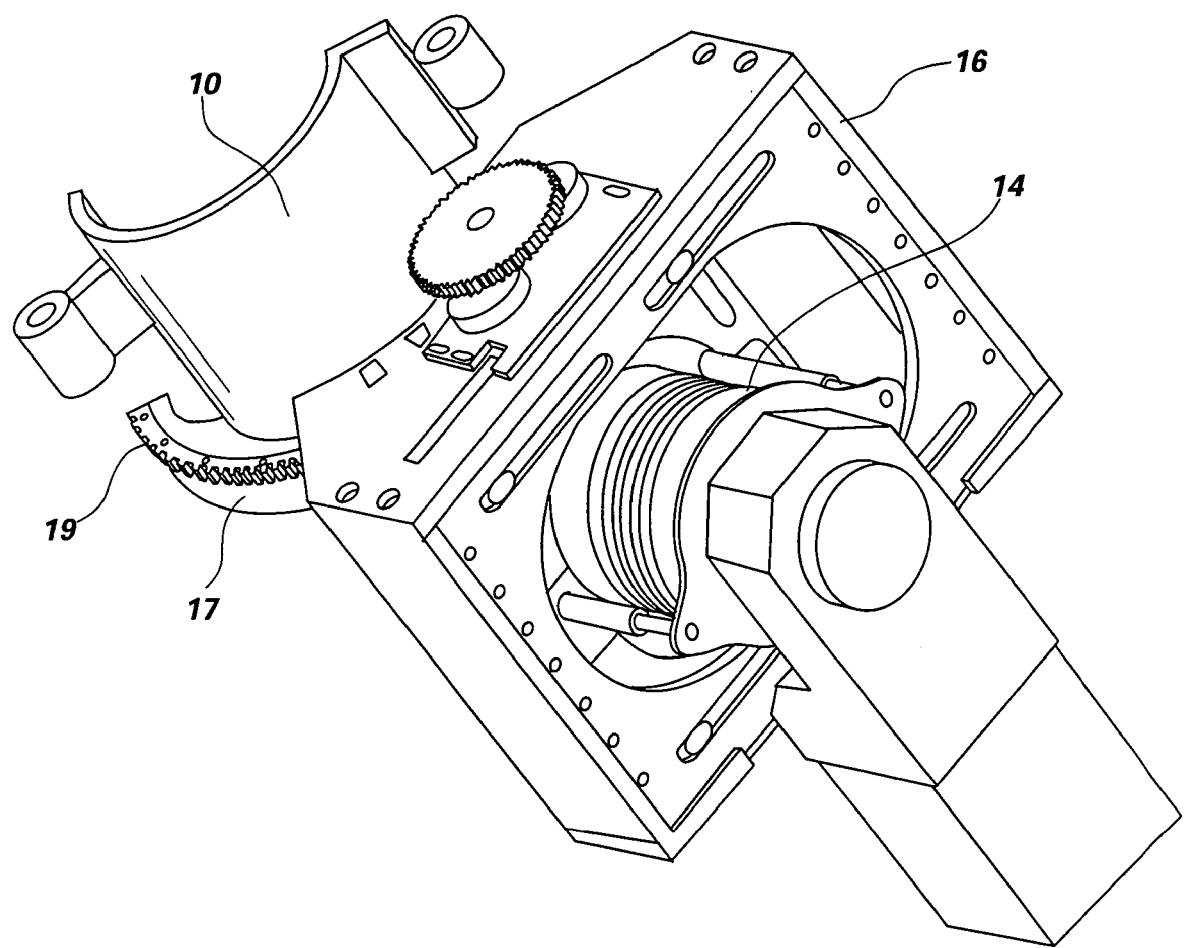
FIG. 3 is a different perspective view of FIG. 1.

FIG. 3 provides another perspective view of the system of FIG. 1, but seen from above the spindle head 14.

Figure 4:
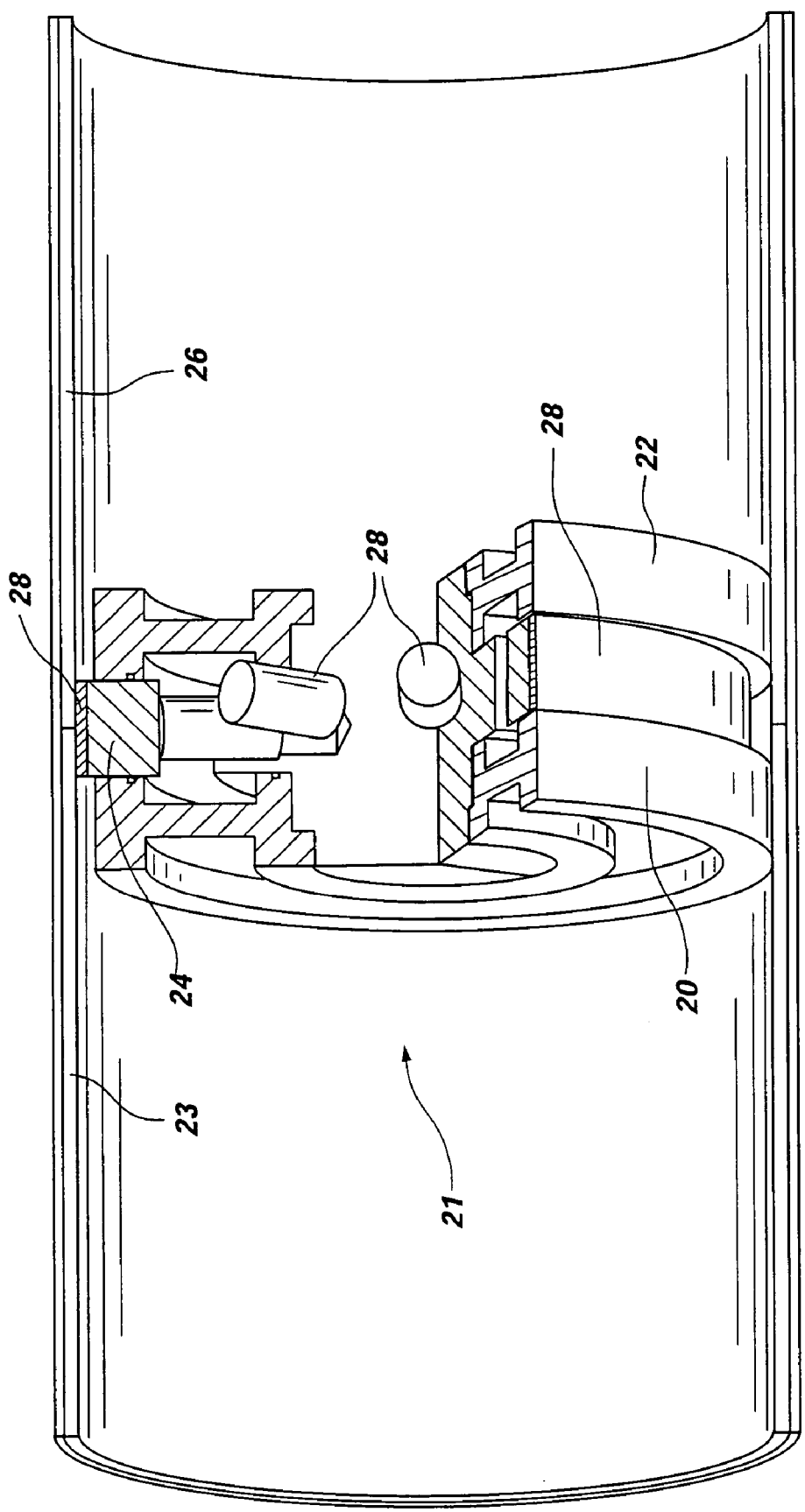
FIG. 4 is a perspective illustration of an active mandrel that is disposed within a pipe to provide a counter-force to a tool pressing on the OD of a high melting temperature pipe to perform friction stir welding on a non-planar surface thereof.

FIG. 4 is provided as a perspective illustration of an anvil assembly 21 that is disposed inside and along a seam between pipes 23 and 26. The anvil assembly 21 provides a counteracting force on the inside diameter (ID) of the pipes 23 and 26 to prevent the tool 12 (FIG. 1) on the OD of the pipes from crushing them. The anvil assembly 21 is comprised of two outer hubs 20, 22, and an inner wheel 24. The inner wheel 24 is forced against the ID of the pipes 23 and 26.

In practice, it has been determined that several pistons 28 will be actuated in order to force the inner wheel 24 against the ID of the pipes 23 and 26. The inner wheel 24 functions as an anvil for the friction stir welding processing being performed on the OD of the pipes 23 and 26.

At present, three pistons 28 are actuated, while five remaining pistons 28 are non-actuated. The pistons 28 on the inside of the inner wheel 24 force the inner wheel against the ID of pipes 23 and 26. Three pistons 28 are used because of the advantageous ability to spread the force among several locations on the ID of pipes 23 and 26. By spreading out the force, the chance of buckling the pipes 23 and 26 is reduced. This can be especially important for pipes that have relatively thin walls. It should be noted that there is substantial pressure being exerted by the tool 12 on the pipes 23 and 26 in order to perform friction stir welding.

By activating three pistons 28, the opposing force of the hubs 20, 22 can be seen to form a triangular force in these figures, with a first point of contact on the ID of the pipes 23 and 26 made by the inner wheel 24, and the other two points of contact being made by the two hubs 20, 22.

Figure 5:
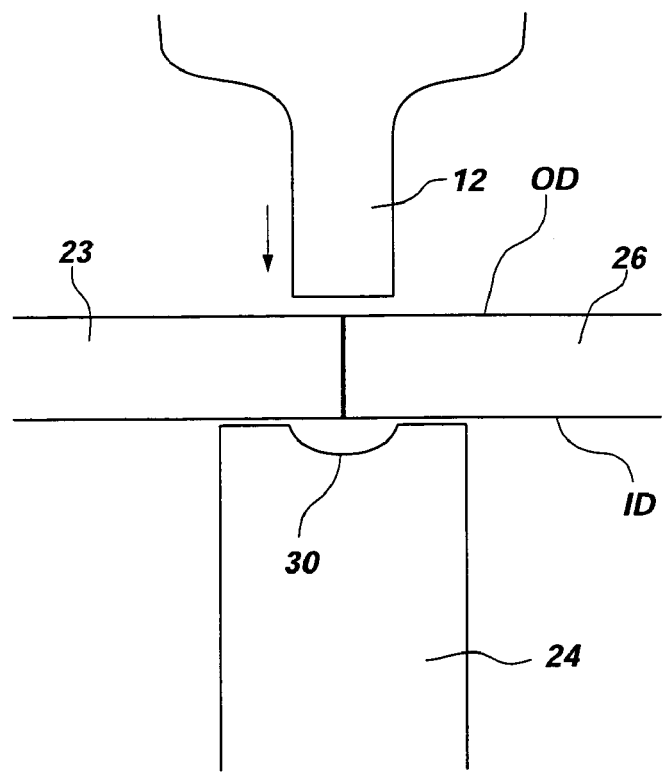
FIG. 5 is a cut-away view illustrating the use of a dimple in an anvil.

It is also shown that the inner wheel 24 may have another material 28 disposed between the inner wheel 24 and the ID of pipes 23 and 26. This material may provide important benefits. For example, the material 28 may include a dimple 30 as shown in FIG. 5.

The dimple 30 enables the tool 12 to push beyond the ID of the pipes 23 and 26 without coming into contact with the inner wheel 24. Pushing beyond the ID enables the tool 12 to remove any root defects in the friction stir weld being formed.

Some important aspects of the invention include applying a material to inner wheel 24 that is in contact with the ID of the pipes 23 and 26. The material is applied to prevent diffusion bonding between the anvil (inner wheel 24) of the anvil assembly 21, and the pipes 23 and 26 as they are friction stir welded.

FIGS. 1 though 4 have illustrated the aspect of the invention where the friction stir welding is being performed from the OD of the pipes 23 and 26, and an anvil assembly 21 functions as a mandrel to prevent the pipes from being crushed by the pressure exerted during the process. However, it is another aspect of the invention that the positions of the components can be reverse. In other words, a different type of anvil assembly can be used to apply pressure to the OD of the pipes 23 and 26, while the friction stir welding components are disposed within the pipes, so that friction stir welding is performed on the ID.

Figure 6:
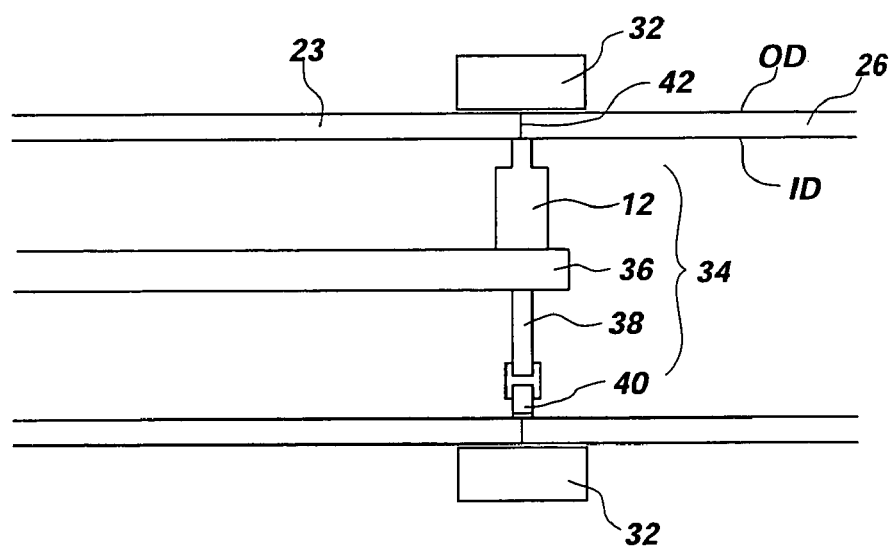
FIG. 6 is a cut-away view of an alternative embodiment wherein the friction stir welding assembly is disposed so as operate on the ID of a pipe, and a mandrel is disposed on the OD.

Such a configuration can have many advantages. For example, it may not be possible to access pipes on the OD, but some type of anvil assembly can be applied. For example, consider pipes 23 and 26 having a band 32 disposed around the OD as shown in FIG. 6. In this figure, a friction stir welding tool 12 is shown as part of a friction stir welding assembly 34, where the tool 12 is disposed along an arm 36 that has an arm 38 with a roller 40 on an end thereof. The arm 38 and roller 40 provide a counter-force to the force being applied by the tool 12 as it is plunged into the ID of pipes 23 and 26. The arm 36 rotates the friction stir welding assembly 34 along a seam 42 between pipes 23 and 26. The band 32 provides the counter-force to the tool 12 and the arm 38 and roller 40 to prevent damage to the pipes 23 and 26.

The system shown in FIG. 6 cannot only be used to weld pipes, but also to perform crack repair. The friction stir welding assembly 34 is moved longitudinally along the inside of the pipes to reach the desired location to perform friction stir welding or friction stir repairs. This system has particular advantages when the OD of a pipe is difficult to reach, whereas it may be possible to slide a band 32 down a length of the pipe until reaching a location where it can be tightened to provide the needed counter-forces.

Figure 7:
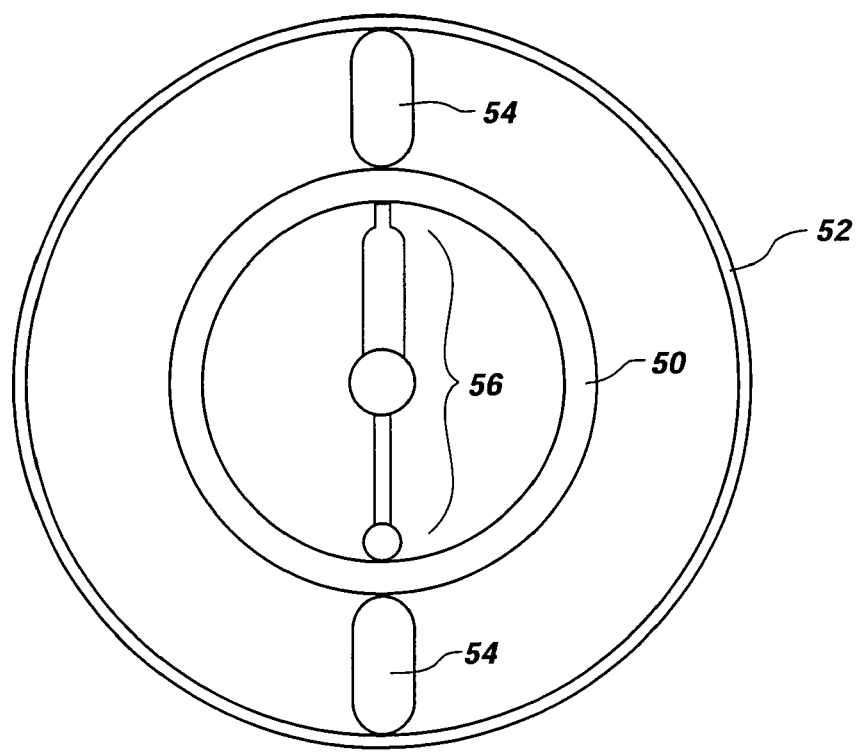
FIG. 7 is an alternative embodiment for an active mandrel disposed on the OD of a non-planar surface.

It should be noted that the band 32 may be configured as any other type of system that applies the required counter-forces. For example, FIG. 7 illustrates that a pipe 50 is encircled by a larger ring 52 that is not in contact with the pipe 50 itself. The larger ring 52 has at least two anvils 54 that can move along the larger ring 52 and apply pressure to the OD of the pipe 50. Pressure is only being applied at locations on the OD directly opposite any locations on the ID where force is being applied by a friction stir welding assembly 56 disposed within the pipe 50. The number of anvils 54 can be increased so as to provide a counter-force for all forces being applied against the ID of the pipe 50.

Figure 8:
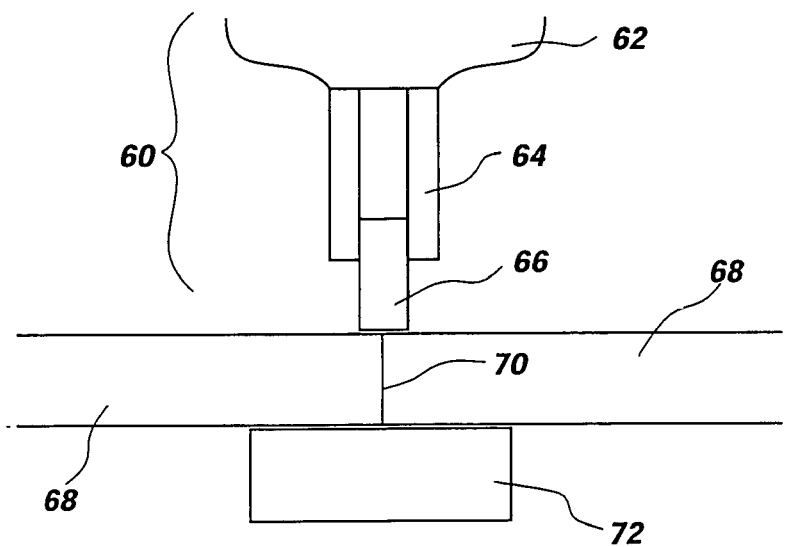
FIG. 8 is an alternative embodiment for a tool for performing friction stir welding on a non-planar surface using a retractable pin.

FIG. 8 is provided to illustrate the concept of using a retractable pin when performing friction stir welding on a non-planar surface. In this cross-sectional view, a tool 60 includes a body or shoulder 62, a pin housing 64, and a retractable pin 66. The retractable pin 66 is plunged into pipes 68 along seam 70. An anvil 72 is disposed on the opposite side of the pipes 68 from the retractable pin 66.

The use of a retractable pin is especially useful in friction stir welding on non-planar surfaces, such as a pipe, because of the lack of a run-off tab or other means of cleanly removing the retractable pin 66 from the material being welded.

Figure 9:
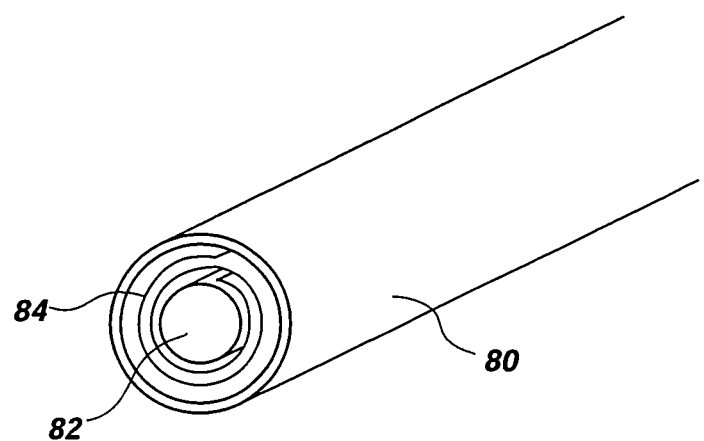
FIG. 9 is an alternative embodiment of a mandrel that is disposed within a pipe to provide a counter-force to a tool pressing on the OD of a high melting temperature pipe to perform friction stir welding on a non-planar surface thereof.

FIG. 9 is provided to illustrate another means for providing support on an inner surface of a non-planar surface such as a pipe 80 on which friction stir welding is to be performed. Specifically, an inner inflatable bladder 82 is disposed in the pipe 80. Between the inflatable bladder 82 and the ID of the pipe 80 is disposed at least one coiled sheet 84 of material. The inflatable bladder 82 is inflated so as to expand and put pressure on the coiled sheet 84. The coiled sheet expands until it is pressed against the ID of the pipe 84. In this particular scenario, it is likely to be important to coat a surface of the coiled sheet 84 so that it will prevent diffusion bonding with the ID of the pipe 84 as it is friction stir welded.

Alternatively, more than one coiled sheet 84 can be disposed around the inflatable bladder 82 to provide added protection for the inflatable bladder 82 to prevent accidental puncturing or melting thereof.

Figure 10:
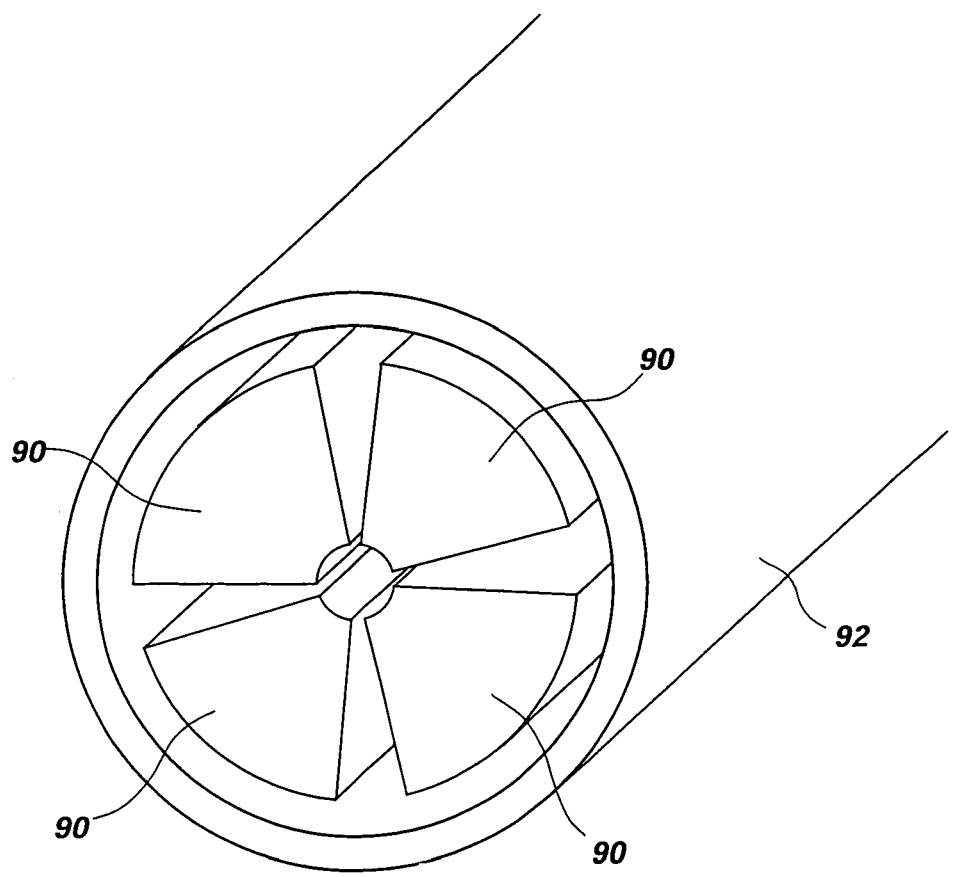
FIG. 10 is an alternative embodiment of a mandrel that is disposed within a pipe to provide a counter-force to a tool pressing on the OD of a high melting temperature pipe to perform friction stir welding on a non-planar surface thereof.

FIG. 10 is provided as an illustration of a segmented mandrel 90. The segmented mandrel 90 is disposed within a pipe 92. The length of the segmented mandrel 90 can be varied as needed. The important aspect of this invention is the ability to provide a means for expanding the segmented mandrel 90 so that it functions as an anvil against a force applied on the OD of the pipe 92 from a friction stir welding or repairing process.

Because the segmented mandrel 90 does not apply a force to the entire ID of the pipe 92, the segmented mandrel 90 will have to be moved as necessary.

Figure 11:
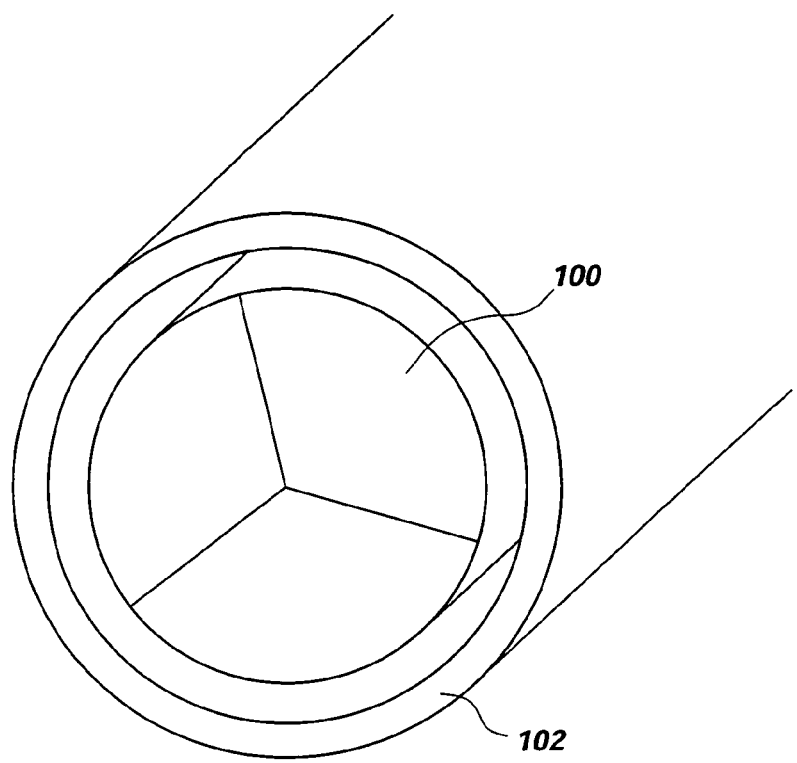
FIG. 11 is an alternative embodiment of a mandrel that is disposed within a pipe to provide a counter-force to a tool pressing on the OD of a high melting temperature pipe to perform friction stir welding on a non-planar surface thereof.

FIG. 11 is an illustration of another type of anvil that can be used to perform the desired friction stir welding on a non-planar surface. In this case, a consumable mandrel 100 is disposed within the interior of a pipe 102. The consumable mandrel 100 can be any material that can provided the needed counter-force on the ID of the pipe as friction stir welding is performed on the OD. The consumable mandrel 100 is comprised of high pressure salts or other soluble material that can be removed from the interior of the pipe 102 once the friction stir welding process has been performed. The consumable mandrel 100 is thus literally washed out of the pipe 102. It should be realized that the material for the consumable mandrel 100 can be formed within the pipe 102, or inserted into the pipe 102 as a single unit.

Figure 12:
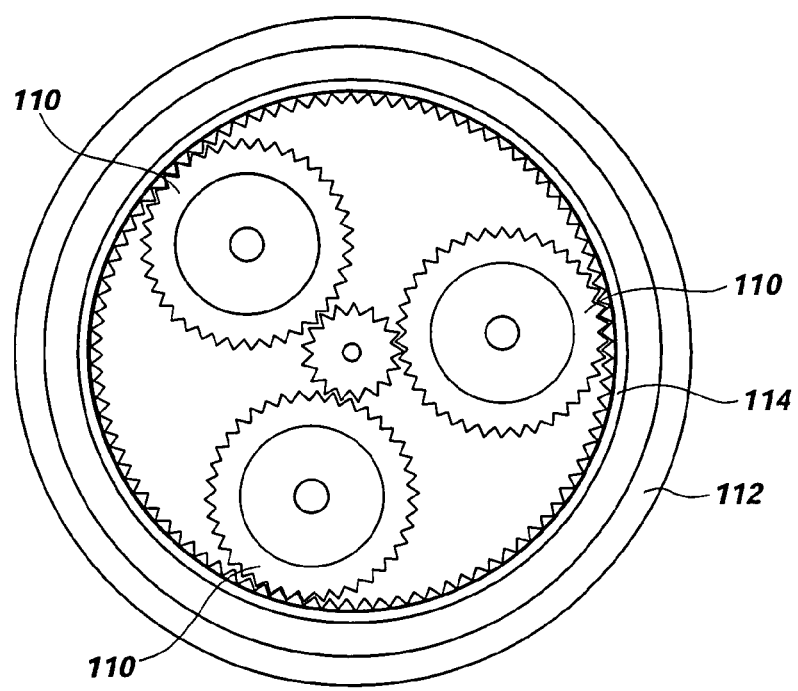
FIG. 12 is an alternative embodiment of a mandrel that is disposed within a pipe to provide a counter-force to a tool pressing on the OD of a high melting temperature pipe to perform friction stir welding on a non-planar surface thereof.

FIG. 12 is provided to illustrate the concept of utilizing a system of planetary gears 110 to provide the necessary counter-forces on the ID of a pipe 112 when friction stir welding is performed on the OD. The planetary gears 110 are utilized by providing a means for turning the planetary gears, thereby causing them to evenly expand an outer ring 114 until it is pressed against the ID of the pipe 112. Those skilled in the art are familiar with the mechanical means for causing the planetary gears 110 to expand the outer ring 114.

Alternatively, it is possible that the planetary gears will be used to unevenly expand the outer ring 114. Thus, the outer ring 114 would be pressed against only a portion of the ID of the pipe 112.

Figure 13:
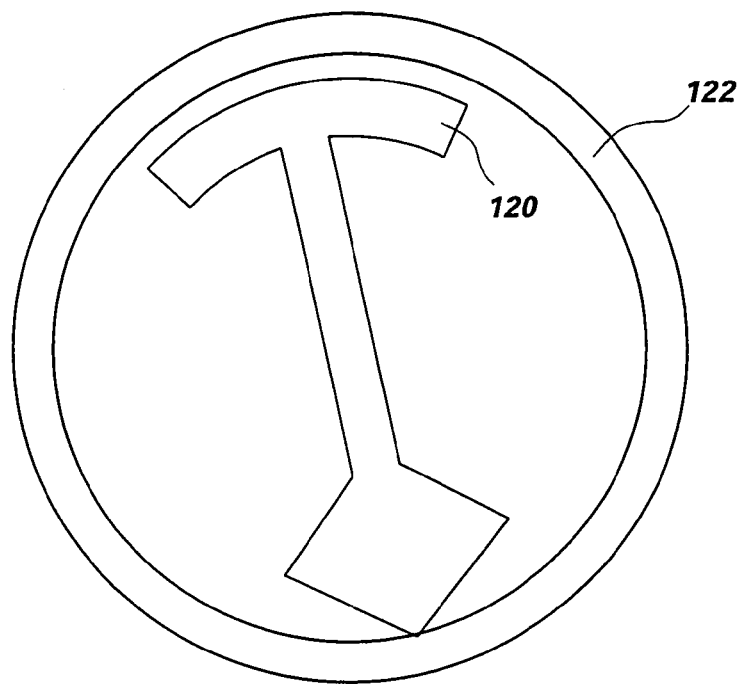
FIG. 13 is an alternative embodiment of a mandrel that is disposed within a pipe to provide a counter-force to a tool pressing on the OD of a high melting temperature pipe to perform friction stir welding on a non-planar surface thereof.

FIG. 13 is provided as another means of providing a counter-force on the ID of a pipe so that friction stir welding can be performed on a non-planar surface. This figure shows a wedge 120 that is manipulated against the ID of the pipe 122. The advantage of this type of anvil is that it is easy moved. Additional bracing may be required to keep the wedge 120 from moving.

Figure 14:
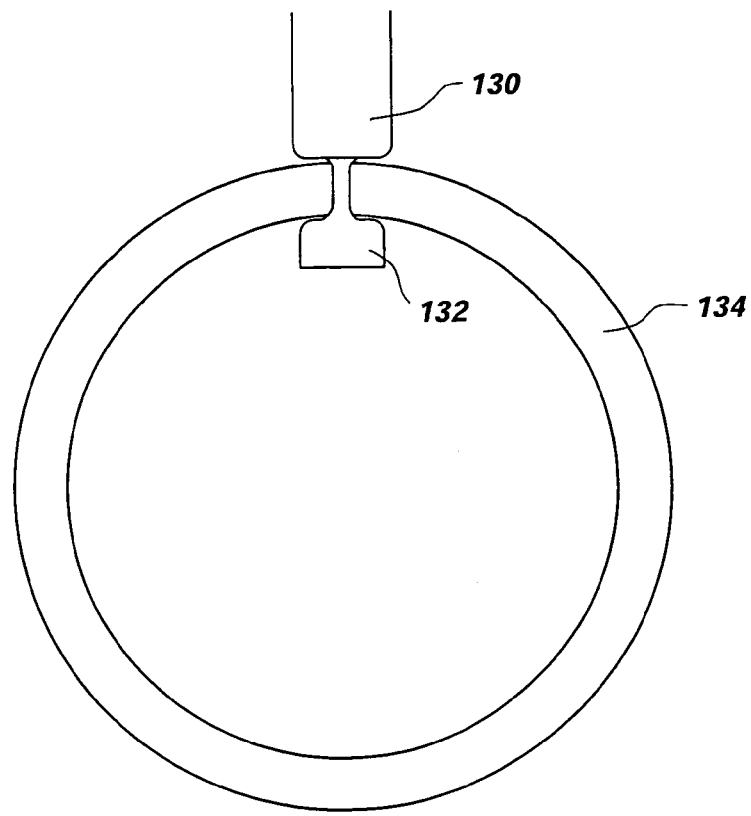
FIG. 14 an alternative embodiment that does not require a mandrel to perform friction stir welding of a non-planar surface.

FIG. 14 is provided as another means of providing a counter-force on the ID of a pipe so that friction stir welding can be performed on a non-planar surface. In this figure, a tool 130 has been modified to include a bobbin 132. The nature of this tool 130 precludes its use in a radial friction stir weld. However, the tool 130 lends itself to friction stir welds that end in a location where the tool can be brought cleanly out of the workpiece. For example, the tool 130 is suited for use in a longitudinal weld along a length of a pipe 134. The tool 134 is thus removed from an end of the pipe 134. The exit site is then processed to clean it up and remove jagged edges, if any.

Figure 15:
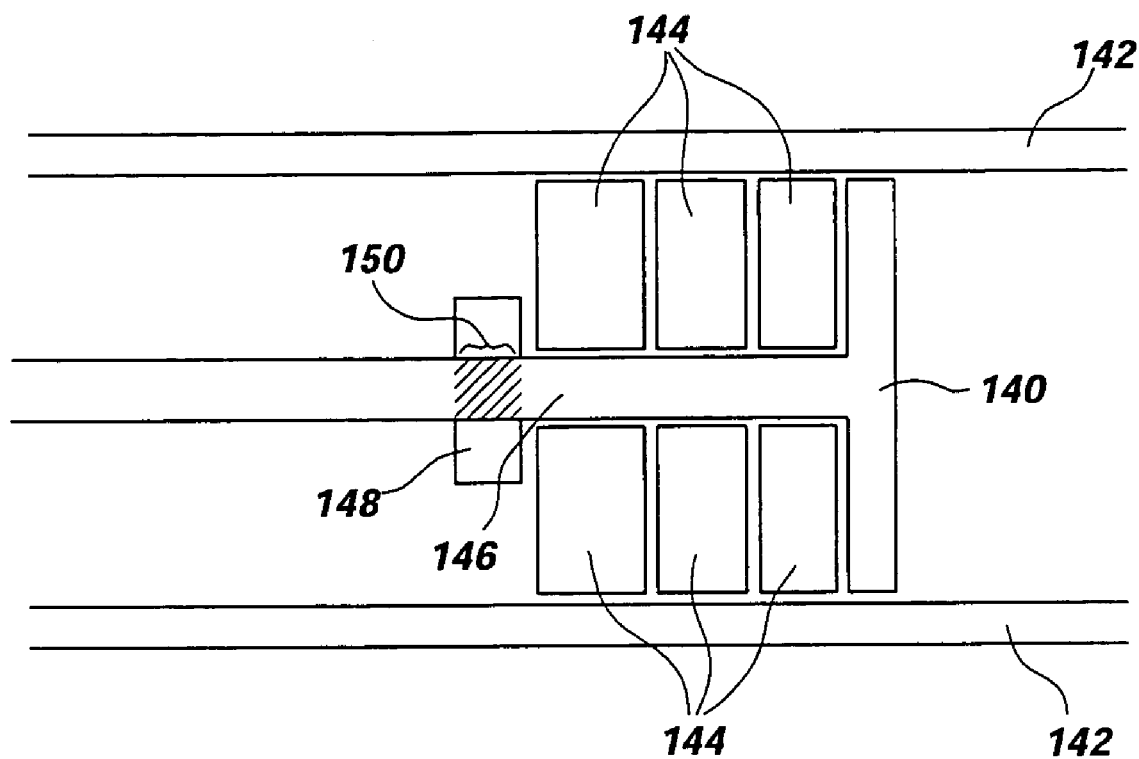
FIG. 15 is an alternative embodiment of a mandrel that is disposed within a pipe to provide a counter-force to a tool pressing on the OD of a high melting temperature pipe to perform friction stir welding on a non-planar surface thereof.

FIG. 15 is also provided as another means of providing a counter-force on the ID of a pipe so that friction stir welding can be performed on a non-planar surface. The concept illustrated is that of a plunger 140 disposed inside a pipe 142. A compressible material 144 is disposed as rings around a handle 146 of the plunger 140. The compressible material 144 could be a metal or any other appropriate material. Some metals can be elastically deformed to a degree that is sufficient to enable them to function as a compressible material of a mandrel.

A stop ring 148 is disposed around the handle 146. The handle is used to pull the plunger 140 back against the compressible material 144 which is turn presses against the stop ring 148. The compressible material expands because of the forces of the plunger 140 and the stop ring 148 being applied.

One method of pulling the plunger 140 back against the compressible material 144 is to provide a threaded portion 150 of the handle 146. The handle 142 is turned to pull on the plunger 140. It should be noted that segments of compressible material 144 can be inserted or removed as needed, depending upon the surface area of the ID of the pipe that will be pressed against by a friction stir welding process on the OD.

FIGS. 1 through 13 and 15 clearly illustrate various systems and methods of providing a counter-force on a side of a non-planar surface that is opposite to a friction stir welding process. While some of these systems only operate when disposed in the interior of a pipe, others are applicable to being used on the outside of a pipe or other non-planar surface. FIG. 14 is different in that no counter force is needed.

Figure 16B:
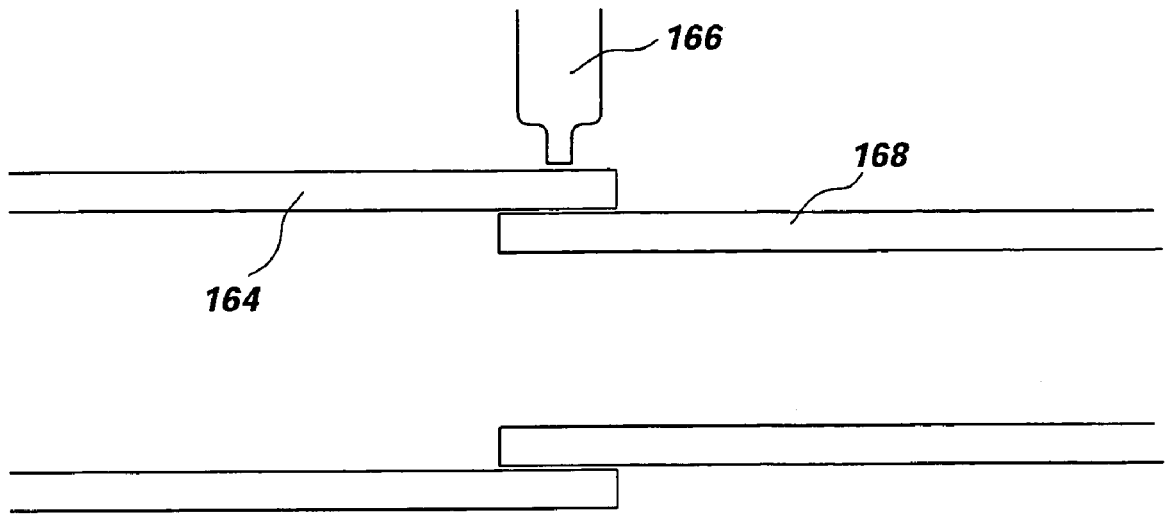
FIG. 16B is a lap weld that does not require the use of a mandrel.
Figure 16A:
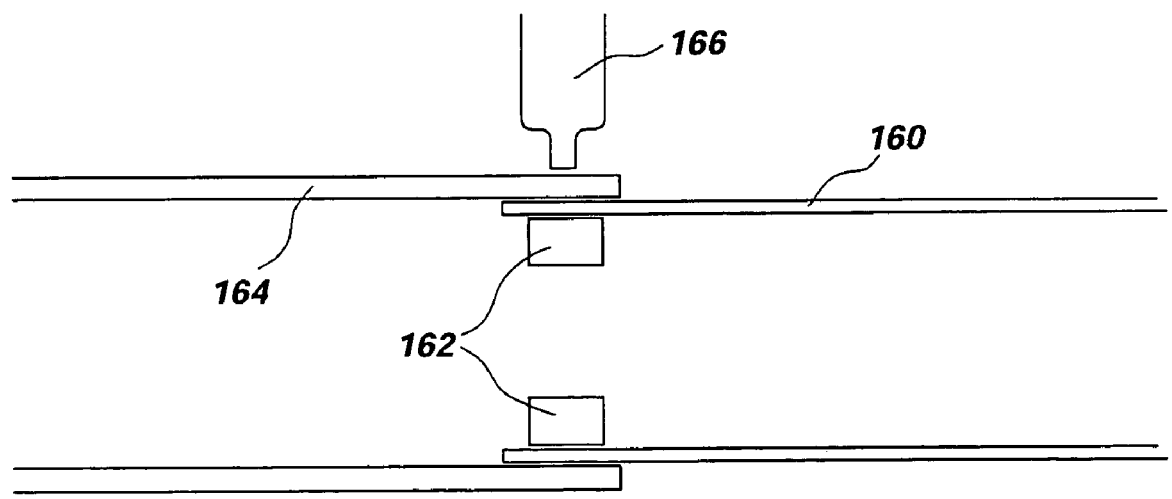
FIG. 16A is a lap weld using an alternative embodiment of a mandrel that is disposed within a pipe to provide a counter-force to a tool pressing on the OD of a high melting temperature pipe to perform friction stir welding on a non-planar surface thereof.

FIGS. 16A and 16B are provided as another means of providing a counter-force on the ID of a pipe so that friction stir welding can be performed on a non-planar surface. In FIG. 16A, a mandrel 162 is clearly being used to provide an anvil to support the pipes 160, 164 when the thickness of the pipe 160 is sufficiently thin that the pressure from the tool 166 is likely to cause the pipes to buckle from the force applied during the friction stir welding process.

In contrast, FIG. 16B illustrates the fact that no mandrel is needed when the thickness of the walls of the pipes 164, 168 are sufficient to support the friction stir welding process when the tool 166 is plunged into the pipes.

Figure 16C:
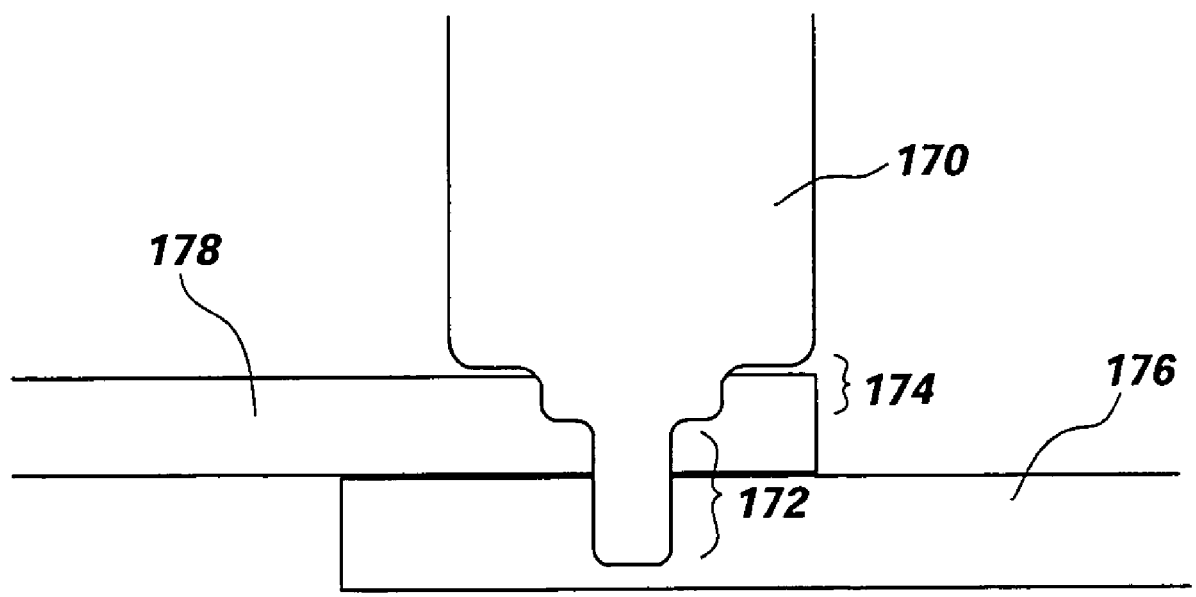
FIG. 16C is a cut-away view of a tool that is modified to perform a lap weld using a friction stir welding tool.

An important aspect of lap welding illustrated in FIGS. 16A and 16B is also shown in FIG. 16C. Specifically, the tool 170 is modified so that there is a first pin 172 and a second pin 174. The first pin 172 penetrates into the second pipe 176. The second pin 174 is important because it performs most of the mixing of the materials in the two pipes 176, 178. The second pin 174 also prevents the material from the second pipe 176 from "hooking up" into the weld.

Another aspect of the present invention relates specifically to joining two non-planar objects. Consider the two pipes 180, 182 in FIG. 17. It may be difficult to align these pipes 180, 182 to perform the friction stir weld. It may also be difficult to keep the pipes 180, 182 aligned once the friction stir welding process begins.

In order to overcome this difficulty, it is another aspect of the present invention to introduce a material that will align the objects being joined. Using the pipes 180, 182 as an illustration of this concept, a ring 184 is shown disposed between the ends of the pipes 180, 182. The ring includes grooves 186 into which the ends of the pipes 180, 182 will fit. The ring 184 clearly has material above the OD and inside the ID of the pipes 180, 182.

This shape can serve useful functions. For example, many welding specifications dictate that a welding tool cannot penetrate inside the ID of a pipe. However, in friction stir welding, it is easy to introduce root defects if penetration is not made. But using the ring 184 shown in FIG. 17, the friction stir welding tool can now eliminate a root defect without actually penetrating through the ID.

Another useful function of the ring 184 is to be able to introduce the same material as the pipes 180, 182 into the weld, or introduce new materials into them. These new materials can be used to modify the characteristics of the weld itself, such as harden or soften it, depending upon the materials used in the ring 184. The materials in the ring are consumed into the weld.

It should also be noted that a complete ring does not have to be used. For example, the ring could be replaced by segments or a rolled material.

Figure 17:
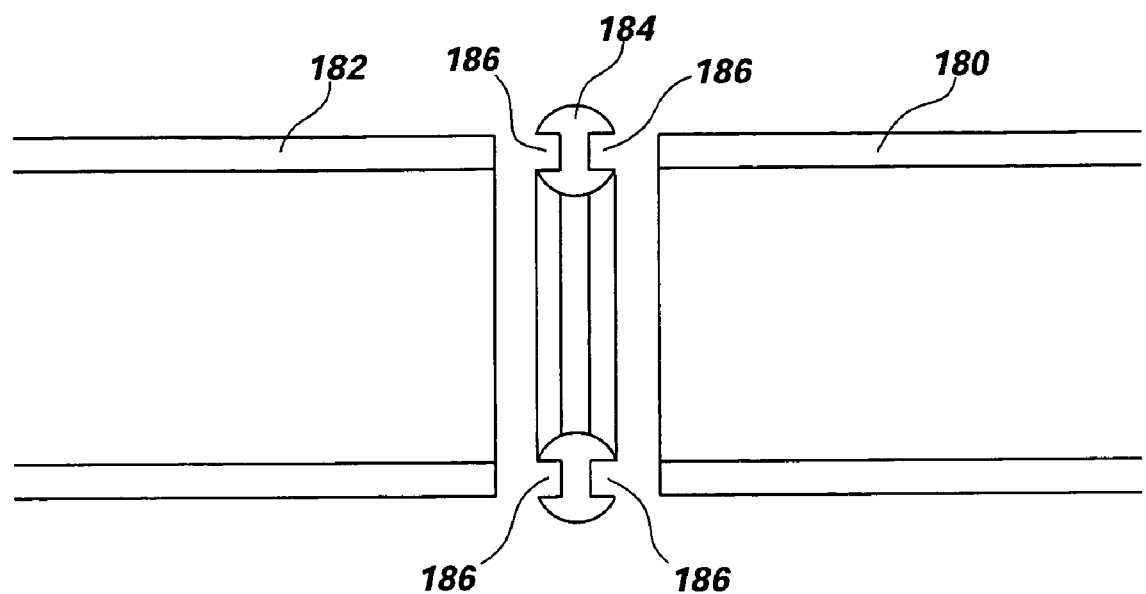
FIG. 17 is a cut-away view of a ring provided for friction stir welding of non-planar surfaces.
Figure 18:
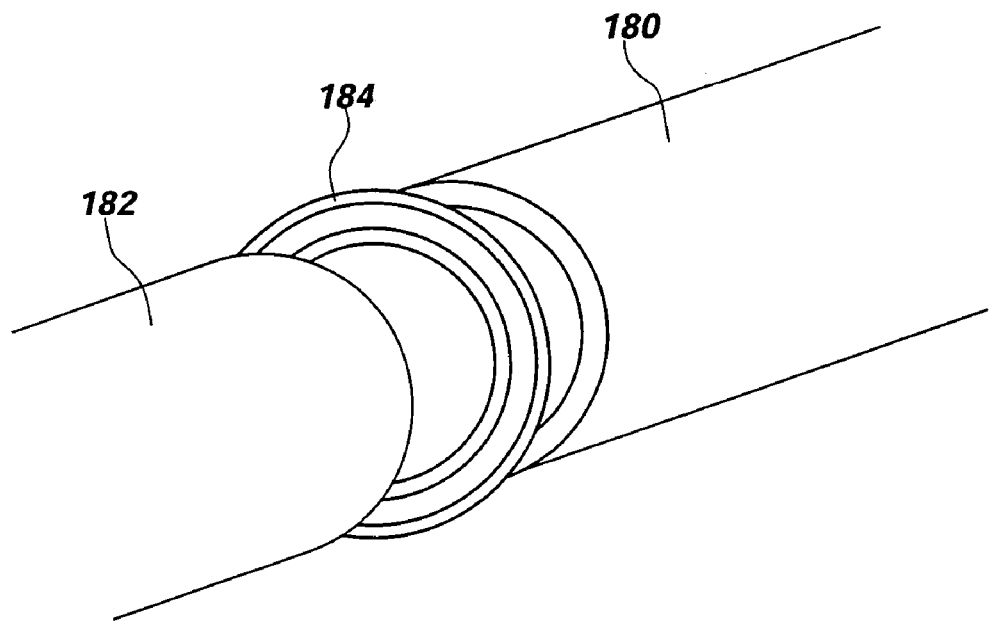
FIG. 18 is a perspective view of the ring and pipes of FIG. 17.

FIG. 18 is provided as a perspective view of the pipes 180, 182 and ring 184 shown in FIG. 17.

Figure 19:
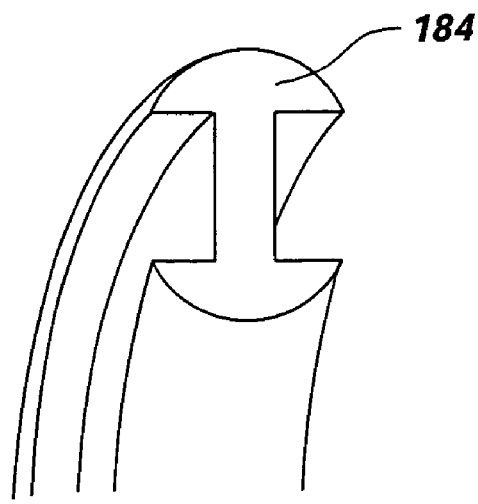
FIG. 19 is a perspective close-up view of the ring of FIGS. 17 and 18.

FIG. 19 is a cut-away perspective view of a portion of the ring 184.

Figure 20:
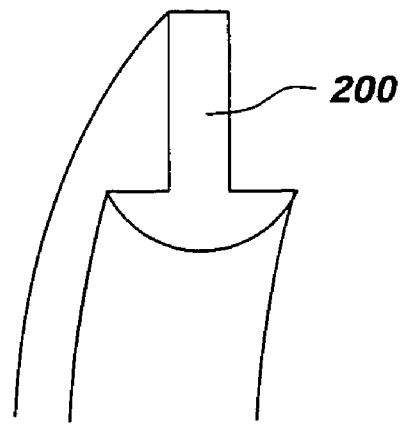
FIG. 20 is a cut-away perspective view of an alternative embodiment for a ring.
Figure 21:
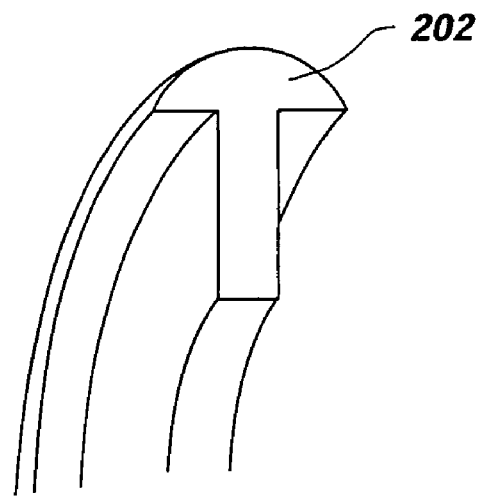
FIG. 21 is a cut-away perspective view of an alternative embodiment for a ring.
Figure 22:
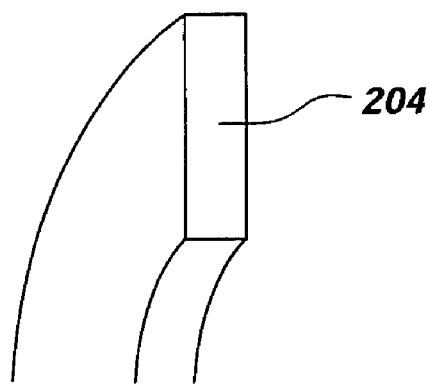
FIG. 22 is a cut-away perspective view of an alternative embodiment for a ring.

The ring 184 shown in FIGS. 17 through 19 provides a ridge of material above and below the OD and ID of the pipes 180, 182. However, rings of other configurations can also be used, depending upon the application. For example, FIG. 20 illustrates a ring 200 having an inner ridge, but no ridge to protrude above the OD of a pipe. FIG. 21 illustrates just the opposite. The ring 202 includes a ridge above the OD, but no ridge to protrude below the ID. FIG. 22 illustrates a ring 204 having no ridge. While this ring 204 does not assist in alignment of pipes, it still serves to introduce the same or new materials into the weld between the pipes.

Other aspects of the present invention should also be mentioned. The present invention illustrates a system for friction stir welding of non-planar surfaces of high melting temperature materials. The present invention provides both active and passive anvils for providing a counter-force to the pressures applied by friction stir welding. Mandrels have been shown on both the OD and the ID of pipes, and can be coated to prevent diffusion bonding.

A key difference between the present invention and friction stir welding systems for aluminum is the need for a PCBN tool, active tool cooling, tool temperature control, load control and the supporting spindle and frame that must handle the loads and dynamics.

Another aspect of the present invention is the discovery that the direction of spin of a friction stir welding tool can affect the quality of the resulting weld. This is especially true when friction stir welding is performed on both sides of a workpiece. This is because the flow of the material in the workpiece has a direct affect on the properties of the resulting weld because the flow can move material into and out of the weld. Consequently, it is another aspect of the invention to specifically claim spinning the friction stir welding tool in a clockwise or a counter clockwise direction, depending upon the desired characteristics of the weld.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A friction stir welding system that is capable of functionally friction stir welding high melting temperature ferrous and non-ferrous alloys, and superalloys, in a non-planar weld, said friction stir welding system comprising:
- a friction stir welding tool having a superabrasive material disposed on at least a portion of the shoulder and the pin, wherein the friction stir welding tool is disposed on a first side of a non-planar surface; and
- a support mandrel disposed against a second side of the non-planar surface so as to counteract a force applied by the friction stir welding tool to the first side, wherein the support mandrel is further comprised of:
  - an inflatable bladder;
  - a coiled sheet of material that can function as a surface of the support mandrel, wherein the inflatable bladder is disposed inside the coiled sheet, and wherein the inflatable bladder can inflate to uncoil the coiled sheet to thereby press against an inner surface of the non-planar surface.

2. The system as defined in claim 1 wherein the system further comprises selecting the non-planar surface from the group of non-planar surfaces comprised of a pipe, flange, tank, and a shroud.

3. The system as defined in claim 2 wherein the system further comprises means for performing longitudinal friction stir welds along the non-planar surface.

4. The system as defined in claim 3 wherein the system further comprises means for performing radial friction stir welds along the non-planar surface.

5. The system as defined in claim 4 wherein the system further comprises the first side of the non-planar surface being an outer diameter (OD) of a pipe, and the second side of the non-planar surface being an inner diameter (ID) of the pipe.

6. The system as defined in claim 5 wherein the system further comprises the first side of the non-planar surface being the ID of a pipe, and the second side of the non-planar surface being an OD of the pipe.

7. The system as defined in claim 6 wherein the system further comprises the support mandrel including a coating to prevent diffusion bonding with the second side of the non-planar surface.

8. The system as defined in claim 7 wherein the support mandrel further comprises a movable mandrel that is capable of movement along a length of the pipe.

9. The system as defined in claim 8 wherein the movable mandrel is capable of movement around the ID of the pipe.

10. The system as defined in claim 8 wherein the movable mandrel is further comprised of:
- an inflatable bladder;
- a coiled sheet of material that can function as a surface of the movable mandrel, wherein the inflatable bladder is disposed inside the coiled sheet, and wherein the inflatable bladder can inflate to uncoil the coiled sheet to thereby press against an inner surface of the non-planar surface.

11. The system as defined in claim 8 wherein the movable mandrel is further comprised of:
an inflatable bladder;
- a segmented material that can function as a surface of the movable mandrel, wherein the inflatable bladder is disposed inside the segmented material, and wherein the inflatable bladder can inflate to cause the segmented material to expand and to thereby press against an inner surface of the non-planar surface.

12. The system as defined in claim 8 wherein the movable mandrel is further comprised of a consumable material, wherein the consumable is disposed so as to be pressed against an inner surface of the non-planar surface, and wherein the consumable material can be removed from the inner surface after friction stir welding is complete, wherein the consumable material provides a counter-force to the friction stir welding tool.

13. The system as defined in claim 8 wherein the movable mandrel is further comprised of a system of planetary gears, wherein the planetary gears are capable of movement to thereby cause an outer ring to expand or contract, to thereby provide a counter-force to the friction stir welding tool when expanded.

14. The system as defined in claim 8 wherein the movable mandrel is further comprised of a wedge, wherein the wedge is capable of being disposed such that it presses against an inner surface of the non-planar surface by friction.

15. The system as defined in claim 8 wherein the movable mandrel is further comprised of a segment of the pin that is disposed on an opposite side of the non-planar surface via a relatively thin connecting segment.

16. The system as defined in claim 8 wherein the movable mandrel is comprised of a plunder system, wherein the plunger system is further comprised of:
- a stopping block;
- a plunger having an arm disposed through the stopping block and a plunger end;
- a compressible material disposed between the stopping block and the plunder end, wherein the plunger end is moved towards the stopping block to thereby compress the compressible material, which is turn is compressed against an inner surface of the non-planar material.

17. A friction stir welding system that is capable of functionally friction stir welding high melting temperature materials, said system comprising:
- a friction stir welding tool having a superabrasive material disposed on at least a portion of the friction stir welding tool, wherein the superabrasive material is manufactured under an ultra high temperature and an ultra high pressure process; and
- a movable mandrel disposed opposite the friction stir welding tool, to thereby create a counter-force to a pressure exerted by the friction stir welding tool on the high melting temperature materials, to thereby prevent damage to the high melting temperature materials.

18. The system as defined in claim 17 wherein the system is further comprised of a clamping system for holding ends of two pipes together in a position that is suitable for friction stir welding of the two pipes.

19. The system as defined in claim 18 wherein the clamping system is further comprised of a first clamp for holding a first pipe, and a second pipe for holding a second pipe.

20. The system as defined in claim 19 wherein the clamping system is further comprised of means for rotating the two pipes to enable the friction stir welding tool to remain stationary while the two pipes are rotated underneath the friction stir welding tool.

21. The system as defined in claim 20 wherein the clamping system is further comprised of means for rotating the friction stir welding tool while the two pipes are held stationary.

22. The system as defined in claim 21 wherein the movable mandrel is disposed inside the two pipes to prevent damage to the two pipes when the friction stir welding tool is welding the ends of the two pipes together.

23. The system as defined in claim 22 wherein the movable mandrel is further comprised of an anvil for generating at least three points of contact between the movable mandrel and an inside diameter (ID) of a pipe, wherein one of the at least three points of contact is directly opposite the friction stir welding tool that is pressing against the outside diameter (OD) of the pipe.

24. The system as defined in claim 23 wherein the anvil for generating the at least three points of contact between the movable mandrel and the ID of the pipe is further comprised of a plurality of pistons, wherein the plurality of pistons are independently controllable to thereby enable at least three to always be in contact with the ID of the pipe.

25. The system as defined in claim 24 wherein the anvil is further comprised of at least three hoops, wherein the at least three hoops are pushed by the plurality of pistons, wherein a middle hoop is disposed so as to apply a force opposite the friction stir welding tool, and wherein at least two outer hoops are disposed so as to provide a counter-force to the middle hoop.

26. The system as defined in claim 25 wherein the at least three hoops can be moved around the ID of the pipe by the plurality of pistons.

27. A friction stir welding system that is capable of functionally friction stir welding two pipes, said system comprising:
 a clamping system for holding ends of the two pipes together in a position that is suitable for friction stir welding of the two pipes; and
 a friction stir welding tool having a superabrasive material disposed on at least a portion of the friction stir welding tool, wherein the superabrasive material is manufactured under an ultra high temperature and an ultra high pressure process.

28. The system as defined in claim 27 wherein the clamping system is further comprised of a first clamp for holding a first pipe, and a second pipe for holding a second pipe.

29. The system as defined in claim 28 wherein the clamping system is further comprised of means for rotating the two pipes to enable the friction stir welding tool to remain stationary while the two pipes are rotated underneath the friction stir welding tool.

30. The systemas defined in claim 29 wherein the clamping system is further comprised of means for rotating the friction stir welding tool while the two pipes are held stationary.

31. A movable mandrel for use in friction stir welding of a pipe, wherein the movable mandrel is disposed inside the pipe, said movable mandrel comprising:
 an anvil for creating a counter-force to a pressure exerted on an outside diameter (OD) of the pipe, to thereby prevent damage to the pipe; and
 a means for moving the movable mandrel along a length of the pipe and around the inside diameter (ID) of the pipe.

32. The system as defined in claim 31 wherein the anvil is further comprised of means for generating at least three points of contact between the movable mandrel and an inside diameter (ID) of the pipe.

33. The system as defined in claim 32 wherein the anvil for generating the at least three points of contact between the anvil and the ID of the pipe is further comprised of a plurality of pistons, wherein the plurality of pistons are independently controllable to thereby enable at least points to always be in contact with the ID of the pipe.

34. The system as defined in claim 33 wherein the plurality of pistons further comprises at least three hoops, wherein the at least three hoops are pushed by the plurality of pistons, wherein a middle hoop is disposed so as to apply a force opposite the friction stir welding tool, and wherein at least two outer hoops are disposed so as to provide a counter-force to the middle hoop.

35. The system as defined in claim 34 wherein the at least three hoops can be moved around the ID of the pipe by the plurality of pistons.

36. The system as defined in claim 35 wherein the means for moving the movable mandrel is further comprised of a plurality of wheels.

* * * * *